United States Patent
Kaufman

[15] 3,692,036
[45] Sept. 19, 1972

[54] FLUID FLOW CONTROL APPARATUS

[72] Inventor: Warren F. Kaufman, Santa Ana, Calif.

[73] Assignee: Philco-Ford Corporation, Philadelphia, Pa.

[22] Filed: April 8, 1971

[21] Appl. No.: 132,314

[52] U.S. Cl. ............................................. 137/81.5
[51] Int. Cl. .............................................. F15c 1/16
[58] Field of Search ................................ 137/81.5

[56] References Cited

UNITED STATES PATENTS

| | | |
|---|---|---|
| 3,447,383 | 6/1969 | Camarata ............ 137/81.5 X |
| 3,456,667 | 7/1969 | Mayer .................... 137/81.5 |
| 3,473,545 | 10/1969 | Boyadjieff ............. 137/81.5 |
| 3,486,521 | 12/1969 | Mayer .................... 137/81.5 |
| 3,490,474 | 1/1970 | Larson ................... 137/81.5 |
| 3,587,605 | 6/1971 | Verplank ............... 137/81.5 |
| 3,493,003 | 2/1970 | Peoples ................. 137/81.5 |
| 3,521,653 | 7/1970 | Becker et al. ......... 137/81.5 |
| 3,598,137 | 8/1971 | Glaze .................... 137/81.5 |
| 3,636,964 | 1/1972 | Colamussi et al. .... 137/81.5 X |

Primary Examiner—Samuel Scott
Attorney—Robert D. Sanborn

[57] ABSTRACT

A fluidic diversion valve, having improved net thrust efficiency, comprises a shunt-staged vortex valve device in which vortex amplifier valves in each of a pair of branches are staged in series with an ejector-diffuser element, and at least a pair of corresponding ones of the amplifier valves have their control ports connected to one another through a cross-bleed conduit.

7 Claims, 4 Drawing Figures

PATENTED SEP 19 1972　　　3,692,036

INVENTOR.
WARREN F. KAUFMAN
BY
Harry W. Hargis III
AGENT 3,692,036

FLUID FLOW CONTROL APPARATUS

BACKGROUND OF THE INVENTION

This invention relates to fluid flow control apparatus, and especially to improvements in fluidic diversion valves.

While of broader applicability, apparatus embodying the invention has especial utility in the reaction control of flight vehicles that are operational over a range of environmental pressure levels as are encountered between sea level and outer space.

It is a general objective of this invention to provide fluidic diversion valve means of the above described general type having operational characteristics that are independent of an external pressure environment.

It is a further and more specific objective of the invention to provide improved diversion valve means for controlling the flow of high temperature gaseous fluid, which valve will operate rapidly with minimal stress on functional components.

SUMMARY OF THE INVENTION

To the foregoing general ends, the invention contemplates fluidic diversion valve apparatus comprising an inlet nozzle, and a pair of identical outlet duct means each fed by said inlet nozzle and terminating in an outlet thrust nozzle. Interposed in each of the ducts, in series flow circuit between the inlet and outlet nozzles, are a first vortex fluid amplifier, an ejector-diffuser, and a second vortex valve fluid amplifier. Each ejector-diffuser comprises a supersonic primary nozzle, a high-velocity, low-pressure free jet region, and a supersonic diffuser. The free jet region is in fluid flow communication with the like region of the other duct, and, in one aspect of the invention, the control port of one of the second vortex fluid amplifiers is in fluid flow communication with the like control port in the other duct.

Advantageously, the disclosed fluidic diversion valve apparatus achieves improved net thrust efficiency over a range of surrounding pressures through its capability for minimizing leakage through the "off" thrust nozzle substantially independently of the surrounding pressure.

For a further understanding of the invention, and the manner in which its objectives and advantages may best be achieved, reference is made to the following description, taken in light of the accompanying drawing.

DESCRIPTION OF THE PREFERRED EMBODIMENT

Figure 1:
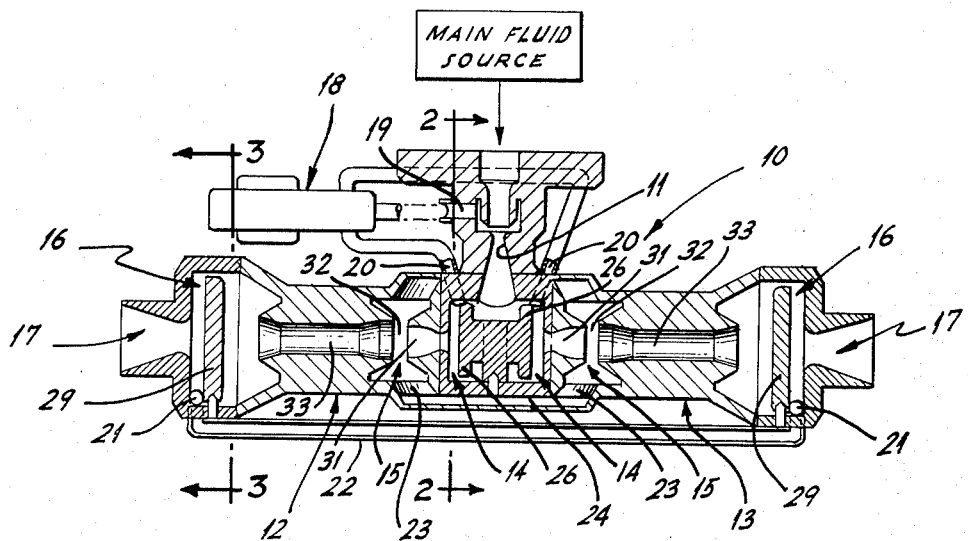
FIG. 1 is an elevational showing, partly in section and with parts broken away, illustrating diversion valve apparatus embodying the invention, and further including showing of a preferred known form of auxiliary control means for portions of the apparatus.
Figure 3:
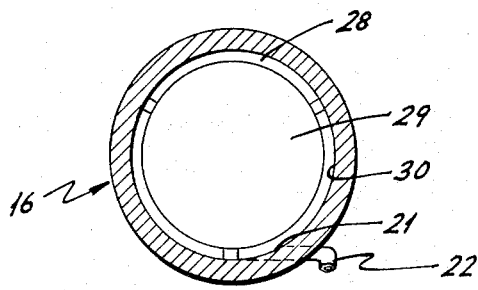
FIG. 3 is a sectional showing of a portion of the apparatus seen in FIG. 1, taken generally along the line indicated by arrows 3—3 applied to FIG. 1.
Figure 2:
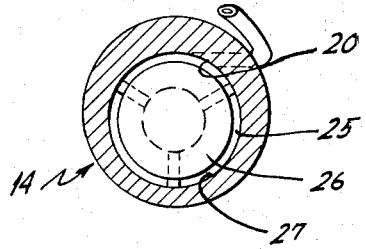
FIG. 2 is a sectional showing of a portion of the apparatus seen in FIG. 1, taken generally along the line indicated by arrows 2—2 applied to FIG. 1.

With more detailed reference to FIGS. 1, 2 and 3, a fluidic diversion valve 10 comprises a primary nozzle 11 disposed in fluid flow communication with a pair of duct means 12 and 13 identical with one another. In view of the identity of duct means 12 and 13, like numerals will be used to designate like parts thereof. Each of duct means 12 and 13 includes, in series fluid flow circuit, a first stage pilot valve 18, a second stage vortex fluid amplifier 14, a third stage ejector-diffuser section 15, a fourth stage vortex fluid amplifier 16, and a reaction nozzle 17.

The first stage pilot valve 18 is of the electro-mechanically actuated flapper, flow proportioning type, and receives its fluid supply through port 19 communicating with the Main Fluid Source in a region immediately upstream of nozzle 11. The outlet conduits of flow proportioning pilot valve 18 are arranged to supply selectively proportioned quantities of control fluid to the vortex-inducing control ports 20 of the second stage vortex fluid amplifiers 14. A valve suitable for use as pilot valve 18, for purposes of the present invention, is disclosed and claimed in U.S. Pat. No. 3,215,162, assigned to the Ford Motor Company. It will of course be understood that other suitable means may be used to supply fluid to control ports 20.

Each of the vortex fluid amplifiers 14 comprises an annular inlet port defined by the annular space 25 (FIG. 2) between the confronting curved side wall of a generally disk-shaped member 26 and the generally cylindrical walls 27 of a vortex chamber. A vortex-inducing control port 20 is positioned in tangential relationship to the vortex chamber in the region of the disk-shaped member.

Each of the third stage, ejector diffuser sections 15 includes a supersonic primary nozzle 31, a high-velocity, low-pressure free jet region 32, and a supersonic fluid diffuser 33. Fluid entering the primary nozzle 31 from vortex fluid amplifier 14 at near-stagnation conditions is accelerated to supersonic velocity as it traverses the free jet region 32 to enter the supersonic diffuser 33. The static pressure of the free jet region 32 is sufficiently low to effect entrainment of fluid at the bleed ports 32. Both primary fluid and entrained fluid are decelerated in the supersonic diffuser 33 to afford high working pressures in the next, or fourth, stage 16. The bleed ports 23 of the ejector-diffuser sections 15 are connected to one another by an annular cross-bleed conduit 24, for purposes more fully to be explained in connection with a description of the operation of the apparatus.

Each of the vortex fluid amplifiers 16 comprises an annular inlet port defined by the annular space 28 (FIG. 3) between the confronting curved side wall of a disk-shaped member 29 and the curved wall 30 of a vortex chamber. A vortex-inducing, control port 21 is provided in the chamber wall 30, in the region of disk-shaped member 29. Gas fluid flowing from a vortex fluid amplifier 16 is discharged through a corresponding reaction nozzle 17, and control ports 21 of the fourth stage vortex fluid amplifiers 16 are connected to one another through a cross-bleed conduit 22.

Figure 4:
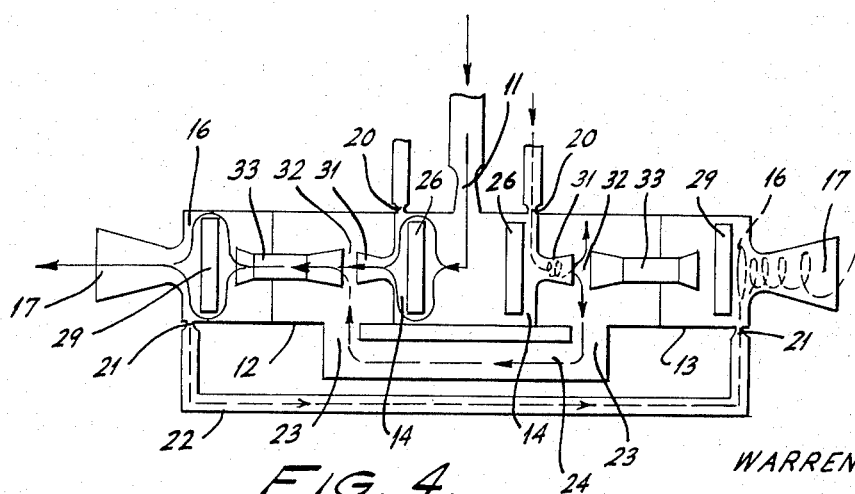
FIG. 4 is a somewhat diagrammatic showing of a portion of the apparatus illustrated in FIG. 1, demonstrating operational features thereof.

In operation of the apparatus, and with reference to FIG. 4, let it be assumed that gaseous fluid is flowing through primary nozzle 11, and that it is desired to effect substantially full discharge gas flow from left-hand reaction nozzle 17, to the exclusion of any significant flow through right-hand reaction nozzle 17. The aforementioned discharge flow is achieved by energizing pilot valve 18 (FIG. 1) so as to direct control flow into right-hand flow control port 20, thereby to effect vortex gas flow within right-hand chamber 14 and through right-hand nozzle 31. Creation of this vortex effectively blocks full flow of gas through right-hand nozzle 31, so that substantially all gas issuing from nozzle 11 is caused to flow through left-hand vortex fluid amplifier 14, and exit therefrom through left-hand nozzle 31 at supersonic velocity. The free jet region 32 flows at low static pressure, and induces leakage gas issuing from right-hand nozzle 31 to flow (broken line arrows) through cross-bleed conduit 24 (broken line arrows) and become entrained in the left-hand free jet region 32, for flow into left-hand supersonic diffuser 33 (solid line arrows), where static pressure is recovered. The main gas stream then flows outwardly from diffuser 33, through annular passage 28 of left-hand vortex amplifier 16, and outwardly through left-hand reaction nozzle 17 in performance of a desired control function.

Further to reduce leakage gas flow through right-hand reaction nozzle 17, a portion of the gas flowing through left-hand vortex amplifier 16 is bled through left-hand control port 21, flows through conduit 22 (broken line arrows) and through right-hand control port 21, where it creates a gas flow-blocking vortex (broken line arrows) in the chamber of right-hand vortex amplifier 16. This vortex-inducing gas, together with any leakage gas, bleeds substantially ineffectively outwardly of right-hand reaction nozzle 17, as is further indicated by broken line flow arrows. Gas flow blockage through a duct 12 or 13 is effective at sea-level as well as at higher altitudes, since the disclosed successive staging of vortex valves 14 and 16, in series gas flow circuit with ejector-diffusers 15 achieves positive control of gas flow independently of surrounding back pressure.

To divert reactive gas flow for discharge from right-hand nozzle 17, pilot valve 18 is operated to direct control flow through left-hand control port 20, whereupon the main and control gas flow paths substantially instantaneously are reversed, to become essentially a mirror image of the paths illustrated in FIG. 4.

It will therefore be appreciated that the invention affords attainment of optimum reactive net thrust efficiency, characterized by minimum leakage through the "off" side thrust nozzle over a wide range of environmental pressure conditions.

I claim:

1. Fluid flow control apparatus comprising, in combination a primary fluid flow nozzle and a pair of identical fluid flow duct means fed by said nozzle; each said duct means including a first vortex fluid amplifier, a supersonic primary nozzle having its inlet in fluid flow communication with the outlet of said first vortex fluid amplifier, a supersonic diffuser spaced from and having its inlet fed by the outlet of said supersonic primary nozzle thereby defining a free jet region therebetween, a second vortex fluid amplifier fed by said supersonic diffuser, and a reaction nozzle having its inlet in fluid flow communication with the outlet of said second vortex fluid amplifier; passage means providing fluid flow communication between each of the recited free jet regions of said pair of duct means; means for controlling the flow of fluid to and from the control ports of each of said second vortex fluid amplifiers; and means for modulating control fluid flow through the control ports of each of said first vortex fluid amplifiers in establishment of major fluid flow, selectively, through one or the other of said pair of duct means for discharge by a corresponding reaction nozzle.

2. Apparatus according to claim 1 and further characterized in that said means for controlling the flow of fluid to and from said control ports of said second vortex fluid amplifiers comprises a cross-bleed duct interconnecting said last recited control ports.

3. Apparatus according to claim 1 and further characterized in that said last recited means for modulating control fluid flow comprises a pilot valve having an inlet port arranged to withdraw fluid from the main fluid stream passing through said primary nozzle, a pair of oppositely disposed outlet ports each arranged to feed fluid to one of said control ports of said first vortex fluid amplifiers, and means for controlling the relative rates of fluid flow through said outlet ports.

4. Apparatus according to claim 3, and further characterized in that said means for controlling the flow of fluid to and from said control ports of said pair of second vortex fluid amplifiers comprises conduit means establishing fluid flow communication between said last recited control ports.

5. A fluidic diversion valve apparatus especially adapted for use as a reaction thruster in the attitude control of a flight vehicle or the like and having improved net thrust efficiency over a relatively wide range of altitudes, said apparatus comprising: a primary fluid flow nozzle adapted for connection to a source of pressurized fluid, and a pair of identical fluid flow duct means fed by said primary nozzle, each said duct means including, in series fluid flow circuit, a first vortex fluid amplifier, a supersonic primary nozzle having its inlet in fluid flow communication with the outlet port of said first vortex fluid amplifier, a supersonic diffuser spaced from and having its inlet fed by the outlet of said supersonic primary nozzle whereby to define a free jet region therebetween, a second vortex fluid amplifier fed by said supersonic diffuser, and a reaction thrust nozzle having its inlet in fluid flow communication with the outlet port of said second vortex fluid amplifier; conduit means providing fluid flow communication between each of the recited free jet regions of said pair of duct means; means for controlling the flow of fluid to and from the control ports of each of said second vortex fluid amplifiers; and means providing for flow of control fluid selectively through one or the other of the control ports of each of said first vortex fluid amplifiers in establishment of major fluid flow through one or the other of said pair of duct means for outflow from a corresponding reaction thrust nozzle in achievement of the recited attitude control.

6. Apparatus according to claim 5, and further characterized in that the inlet port of each of said vortex fluid amplifier is of annular configuration.

7. Apparatus according to claim 5, and further characterized in that said means for controlling the flow of fluid to and from said control ports of said pair of second vortex fluid amplifiers comprises conduit means establishing fluid flow communication between said last recited control ports.

* * * * *